United States Patent Office 2,745,853
Patented May 15, 1956

2,745,853

PREPARATION OF AMIDES

Lyle A. Hamilton and Robert H. Williams, Pitman, N. J., assignors to Socony Mobil Oil Company, Inc., a corporation of New York No Drawing. Application February 2, 1953,
Serial No. 334,744

9 Claims. (Cl. 260—404)

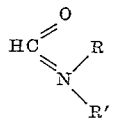

This invention relates to organic nitrogen-containing compounds. It is more particularly concerned with a novel process for the preparation of organic amides.

As is well known to those familiar with the art, many processes have been proposed for the preparation of amides. The most usual methods have involved the reaction between a carboxylic acid and ammonia or an amine, with the elimination of water. Frequently, however, such processes have been disadvantages in many respects, for example, due to the relatively high cost of reactants. Such a situation is frequently encountered when it is desired to prepare amides of the relatively unavailable (and expensive) acids having an odd number of carbon atoms. The preparation of highly branched-chain amides has been even more difficult to achieve.

It has now been found that amides and substituted derivatives thereof can be produced by a process which is simple and feasible. It has been discovered that such products can be produced by reacting formamide or an N-alkyl formamide, with an ethylenically unsaturated hydrocarbon having no conjugated double bonds in the presence of a peroxide catalyst.

Accordingly, it is an object of this invention to provide a novel method for the preparation of organic amides and derivatives thereof. Another object is to provide a process for preparing amides of fatty acids, particularly of fatty acids having an odd number of carbon atoms; and amides of other aliphatic carboxylic acids. A further object is to provide novel, highly branched-chain fatty acid amides. Other objects and advantages of this invention will become apparent to those skilled in the art, from the following detailed description.

Broadly stated, this invention provides a process for producing amides and derivatives thereof, which comprises reacting an ethylenically unsaturated hydrocarbon having no conjugated double bonds with a formamide having the formula, $$\text{HC}\underset{\underset{R'}{N}}{\overset{\overset{O}{\parallel}}{\diagdown}}R$$

wherein R and R' are hydrogen atoms or alkyl radicals; in the presence of a peroxide catalyst. It also provides certain novel amides produced thereby.

In general, any organic hydrocarbon having at least one ethylenic carbon to carbon double bond is utilizable in the process of this invention, provided it is not a readily polymerizable compound. The "readily polymerizable" compounds are those having a conjugated double bond system, i. e., the group

—C=C—C=C— or

—C=C—C≡C—

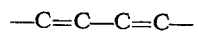

Diolefinic hydrocarbons other than conjugated diolefinic compounds, e. g., hexadiene-1,5, are operable and contemplated herein. It is to be noted that a conjugated double bond system which forms part of an aromatic compound is also included within the definition of a readily polymerizable compound. For example, the olefinic double bond of styrene is conjugated with a double bond of the benzene ring. Styrene is inoperable herein.

Olefinic hydrocarbons devoid of conjugated double bonds are of many classes. One such class is the normal alkenes. Non-limiting examples of the alkene reactant are normal 1-olefins, such as, ethylene; propylene; butene-1; pentene-1; hexene-1; heptene-1; ocetene-1; nonene-1; decene-1; undecene-1; dodecene-1; tridecene-1; tetradecene-1; pentadecene-1; hexadecene-1; and octadecene-1; olefins having branching beyond the 2 position; and straight-chain olefins having internal double bonds, such as, butene-2; hexene-3; octene-2; octene-4; decene-5; octadecene-9; and other similar types obtainable by position isomerization of a 1-olefin and by other means well known in the art.

Commercial sources from which 1-alkenes and normal alkenes having internal double bonds can be obtained are cracked wax, cracked paraffinic oils, wax or paraffinic oils which have been chlorinated and subsequently dehydrochlorinated, and the products obtained from the Fischer-Tropsch synthesis and its variations. Most versions of the Fischer-Tropsch, Synthine, or Hydrocol process yield large amounts of olefins, particularly normal 1-olefins ranging from butene-1 to olefins having 30 to 40 carbon atoms per molecule. These 1-olefins may be isomerized readily to alkenes having internal, rather than terminal, double bonds. Crude mixtures of these olefins may be used, or one can use purified materials, such as for example, butene-1; pentene-1; hexene-1; octene-1; decene-1; octadecene-1; and tetracontene-1. Other commercially available olefin reactants are ethylene polymers of 2 to 100 units, and dimers, trimers, tetramers, pentamers, and higher polymers of other 1-olefins up to and including tetracontene-1.

In addition to the normal alkenes in which the double bond can be terminal or internal, a large variety of other olefins with branched-chain structures are suitable, but less desirable. These include members of the series represented by 1,2-dialkyl ethylenes and 1,1,2-trialkyl ethylenes. Non-limiting examples are isobutylene; isoamylene; isohexenes; isoheptenes; 2,4,4-trimethylpentene-1; 2,4,4,6,6-pentamethylheptene-1; 2,5,7,7-tetramethyl octene-1; 2-ethylhexene-1; 2-ethylbutene-1; 1,1,2-trimethylethene; 1,1-diethyl-2-methylethene; 2,4,4-trimethylpentene-2; and 2,4,4,6,6-pentamethylheptene-2. Other similar compounds can be used, wherein the substituent alkyl group or groups can have between one and twenty carbon atoms per radical. Many of these olefins are present in diisobutylene, triisobutylene, and dimers of other isoolefins. Some of the tetra-substituted ethenes, such as tetramethylethene, tetraethylethene, and tetra-n-butylethene are satisfactory for use in the process of the present invention. Those containing two or three methyl substituents and a branched-chain radical as the fourth substituent are also suitable. It has been found, however, that several highly branched-chain alkyl groups substituted about the double bond serve to hinder the activity of the double bond to a large extent. Accordingly, olefins such as tetraisopropylethene are not preferred.

The aforementioned aliphatic-substituted olefins include open-chain alkyl radicals as substituents. Any of these alkyl radicals can be replaced by a cycloalkyl, or an alkylated cycloalkyl radical, such as, for example, cyclohexyl, cyclopentyl, ethylcyclohexyl, amylcyclohexyl, octylcyclopentyl, methylcyclopentyl, pinenyl, camphenyl, dimethylcyclopentyl, or trimethylcyclohexyl radicals. These cyclic substituents are equally as satisfactory as the open-chain alkyl groups mentioned hereinbefore.

Cyclic olefins are suitable olefin reactants. Non-limiting examples are cyclopropene; cyclobutene; 1-methylcyclobutene-1; cyclopentene; 3-ethylcyclopentene-1; laurolene; 1-propylcyclopentene-1; apofenene; campholene; dihydrosabinene; cyclohexene; 1-ethylcyclohexene-1; pulanene; o-menthene; suberene; eucarvene; civetene; limonene; α-pinene; β-pinene; and santene.

Diolefins are particularly suitable reactants in the present process, provided they are not conjugated, since they will produce two types of useful products. Reaction at only one of the double bonds yields unsaturated amide derivatives, whereas reaction at both double bonds produces di-amide substituted compounds, wherein two formamide groups are attached to the same carbon chain.

Non-conjugated diolefins are useful. Non-limiting examples of non-conjugated diolefins are hexadiene-1,5; pentadiene-1,4; 1-vinylcyclohexene-3; terpenolene; decadiene-1,5; menthadiene; tetradecadiene-1,8; heptadiene-1,6; 4-ethylhexadiene-1,4; decadiene-1,9; 3-ethyloctadiene-1,5; tetradecadiene-1,4; 4,5-dipropyloctadiene-2,6; licosadiene-1,19; tetratriacontadiene-9,25; cyclohexadiene-1,4; cyclooctadiene-1,5; 3,3-dimethycyclohexadiene-1,4; 2,6,6-trimethylcycloheptadiene-1,4; gamma-terpinene; and cyclotriacontadiene-1,16. These olefins are obtained from many sources well known to those familiar with the art. Mixtures thereof can be obtained by drastic cracking, or by halogenation and dehydrohalogenation, or paraffinic materials.

The amide reactants contemplated herein are formamide and N-alkyl derivatives thereof, having the formula,

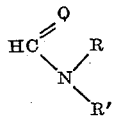

wherein R and R' are hydrogen or alkyl radicals. These alkyl radicals can be straight-chain or branched-chain. They can have between one carbon atom and about 18 carbon atoms per radical. Preferably, they are lower alkyl radicals, i. e., those having between one carbon atom and about 5 carbon atoms. Non-limiting examples of the formamide reactant are formamide; N-methylformamide; N,N-dimethylformamide; N-ethylformamide; N,N-diethylformamide; N-propylformamide; N,N-diisopropylformamide; N-butylformamide; N,N-di-t-amylformamide; N-octylformamide; N-2-ethylhexylformamide; N-decylformamide; N,N-didodecylformamide; N-hexadecylformamide; N,N-dioctadecylformamide; and N-octadecylformamide.

The catalysts for the process of this invention are the organic peroxides. As is well known to those skilled in the art, the peroxide catalysts are activated at various temperatures dependent upon structure. The activation temperatures for the individual catalysts are well known, however, and can be readily obtained. Non-limiting examples of typical organic peroxide catalysts and their range of activation temperatures are: (a) diacyl peroxides at temperatures varying between about 50° C. and about 110° C., such as dibenzoyl peroxide, lauroyl peroxide, bis(p-chlorobenzoyl-) peroxide, bis(2,4-dichlorobenzoyl-) peroxide, bis(m-nitrobenzoyl) peroxide, bis(p-nitrobenzoyl) peroxide, and acetyl peroxide (usually in dimethyl phthalate solution); (b) di-n-alkyl peroxides, such as dimethyl peroxide, diethyl peroxide, and methylethyl peroxide, at temperatures varying between about 20° C. and about 100° C.; (c) di-secondary-alkyl peroxides at temperatures varying between about 50° C. and about 130° C.; (d) di-t-alkyl peroxides at temperatures varying between about 100° C. and about 200° C., such as di-t-butyl peroxide, di-t-amyl peroxide, $(CH_3CH_2)_3COOC(CH_2CH_3)_3$ and $(CH_3)_3CC(CH_3)_2OOC(CH_3)_3$; and (e) substituted alkyl peroxides and arylalkyl peroxides, such as hydroxyheptyl peroxide, $HOCH_2OOCH_3$, $CH_3CH(OH)OOCH_3$, $C_2H_5OOCH_2OH$
$C_2H_5OOCH(OH)CH_3$

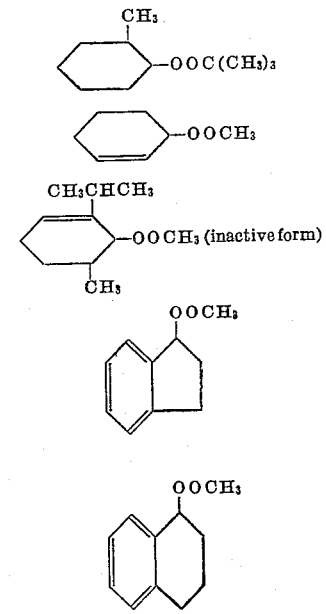

and

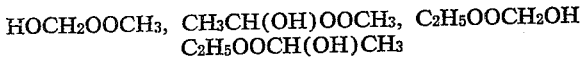

The amounts of the peroxides necessary to initiate the reaction of the present invention will vary somewhat dependent on the reactivity of the reagents used; the more reactive reactants requiring relatively less catalyst. In practice, ordinarily, amounts varying between about 0.1 mole per cent and about 10 mole per cent of peroxide, based upon the amount of unsaturated compound reactant, will be used.

The temperature of the reaction is critical only to the extent that it is necessary to activate the catalyst. It is governed primarily by the particular reactants chosen. In general, the temperature used will be that at which free radicals are formed, as disclosed hereinbefore.

The time of reaction is not too critical a factor. It is a function of several other variables, such as the type of reactant, amount of reactant, temperature of reaction, and the catalyst employed to intiate the reaction. As will be appreciated by those skilled in the art, longer reaction times are generally required when lower reaction temperatures are employed. Likewise, the amount of heat produced in the exothermic reactions may be so great that a longer time of addition of the catalyst, with a consequent longer reaction time, will be necessary in order to prevent the reaction mixture from greatly exceeding the desired reaction temperature. In general, the reaction time will be between about 5 hours and about 70 hours.

As will be apparent to those skilled in the art, the reaction of the present invention should be carried out with the reactants in intimate contact, either in a homogeneous liquid phase, or as an emulsion. In the case of emulsions, the reaction will be almost entirely on the surface of the emulsion particles, and, accordingly, the rate of reaction will depend on the area of surface, i. e., on the fineness of the emulsion. Especially when the reactants are not miscible in each other, mutual solvents may be employed in the reaction. These can be solvents which do not enter chemically into the reaction, or they can be substances which will furnish free radicals under the reaction conditions, such as acetone under the influence of ultraviolet light. In general, however, a solvent is not necessary to the present reaction. When polar solvents, such as water, are used, an increase in reaction rate can sometimes be attained by using alkaline conditions, rather than acidic or neutral conditions, but the reaction, aside from the rate, will be the same. Non-limiting examples of the solvents utilizable herein are hydrocarbons and hydrocarbon mixtures, such as hexanes, octanes, dodecane, cetane, cyclohexane, petroleum ether naphtha, benzene, toluene, xylene, trimethylnaphthalenes, etc.; alcohols, such as methanol, ethanol, propanol-1, butanol-1, hexanol-1, dodecanol-1, octadecanol-1, etc.; esters, such as ethyl acetate, n-amyl acetate; n-octyl acetate, methyl propionate, ethyl n-butyrate, methyl n-valerate, ethyl isovalerate, etc.; ketones, such as acetone, methyl ethyl ketone, diethyl ketone, etc.; ethers, such as diethyl ether, di-n-propyl ether, methyl n-butyl ether, ethylene glycol dimethyl ether, diphenyl ether, dioxane-1,4; carbitols, etc.; polyhydric alcohols, or glycols, such as ethylene glycol, hexamethylene glycol, propylene glycol, triethylene glycol, etc.

The reaction product can be isolated by the well-known methods of separation, such as crystallization, solvent extraction, filtration, and distillation, depending on the particular reactants chosen. In general, the reaction product is obtained as the residue, after unreacted materials and by-products have been distilled out, usually under reduced pressures of 1–10 millimeters. Some of the products can themselves be distilled from the reaction mixture, usually under reduced pressure.

The reaction involved in the process of this invention is essentially an addition reaction across the olefinic double bond. Two types of reactions and reaction products are achieved, often simultaneously. The first type is a simple monomeric addition, in accordance with the equation:

(1)

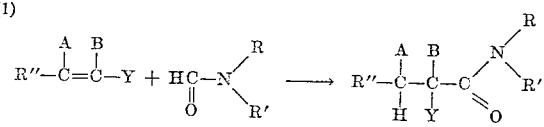

In this equation, R and R' are as defined hereinbefore. R'', A, B, and Y can be hydrogen, alkyl, cycloalkyl, etc., according to the olefinic compound reactant used. Also, when a cycloolefin is employed, A and B conjointly can form fragments of the cyclic compound, wherein the group

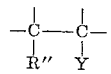

forms the remaining fragment of the ring.

The second type of reaction involves simple monomeric addition, along with the addition of further molecules, up to about five, of the olefinic hydrocarbon reactant, as follows:

(2)

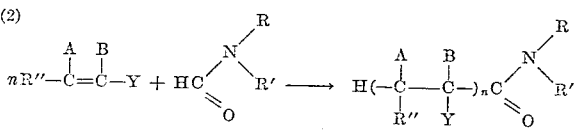

In Equation 2, R, R', R'', A, B, and Y are as defined hereinabove, and $n$ is an integer of from 2 to 5. The products of Equation 2, it will be noted, are novel branched-chain fatty acid amides. For example, when three moles of octene-2 are added to one mole of formamide, as in Equation 2, A, B, R, and R' are hydrogen atoms, Y is a methyl radical, R'' is an amyl radical, and $n$ is 3. The product would be 2,4,6-trimethyl-3,5-diamyldodecanoamide, having the structure:

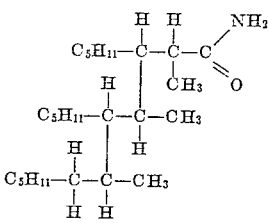

Other compounds of similar structure can be produced, depending upon the olefinic hydrocarbon reactant.

Especially preferred products of this invention are those having the formula,

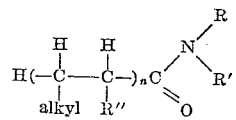

wherein R, R' and R'' are alkyl radicals or hydrogen atoms, and $n$ is an integer of between two and five. Non-limiting examples of these products are, in addition to those already described and those characterized in the working examples, N-methyl-3,5,7,9-tetraethyltridecanoamide; N,N - dimethyl-2,3,4,5,6-pentaethylnonanoamide; N-ethyl-2,3,4-trioctyltridecanoamide; N,N-diethyl-2,3,4,-5,6-pentamethyloctanoamide; N - propyl-2,4,6,8,10,12,12-heptamethyl-3,5,7,9-tetra-t-butyltridecanoamide; N,N - diisopropyl-2,4,6,6,8,8-hexamethyl - 3 -(1,1,3,3-tetramethylbutyl)nonanoamide; N,N-dibutyl - 2,3,4,5,6,7,8,9,10-nonapropyltetradecanoamide; N-2-ethylhexyl - 3 - hexadecylheneicosanoamide; 2,4,6,8-tetramethyl - 3,5,7 - triethylundecanoamide; 2,4-diethyl-3,5-dibutylnonanoamide; N-decyl-7,7,9,9-tetramethyl-3-(2,2,4,4 - tetramethylamyl)decanoamide; 3,3,5,5,7-pentaethylnonanoamide; 3-(2,2-dimethylpropyl)-7,7-dimethyloctanoamide; 3,5-dioctylpentadecanoamide; and N-octadecyl-3,5-didecylheptadecanoamide.

The products of this invention have a wide range of uses, including mineral oil additives, etc. These products are especially useful, however, as intermediates for organic syntheses. Thus, they can be hydrolyzed to the corresponding carboxylic acid, which can then be converted to salts, esters, etc., for use as oil additives, detergents, drying agents, etc.

The following examples are for the purpose of illustrating the process of this invention and certain novel products produced thereby. It must be strictly understood that this invention is not to be limited to the specific reactants or conditions used in the examples, or to the operations or manipulations involved therein. As those skilled in the art will readily appreciate, a wide variety of other reactants can be used, in accordance with the discussion set forth hereinbefore.

EXAMPLE 1

A mixture of 180 grams (4 moles) of formamide and 112 grams (1 mole) of octene-1 in 400 grams of diethyl carbitol (mutual solvent) was heated at 135° C. for 24 hours. During the first six hours of the reaction time, 14 grams (0.098 mole) of di-t-butyl peroxide were added portionwise. The crude reaction mixture was then subjected to distillation at 63–69° C. vapor temperature (67–150° C. pot temperature) under 3 mm. pressure to remove the solvent and unreacted materials. The residue, i. e., the crude product weighed 117.9 grams, representing a yield of 95.2 per cent. It contained 2.96 per cent nitrogen.

This reaction was repeated on a larger scale. A sample of the product was subjected to distillation on a molecular still. The fractions obtained and pertinent data therefor are set forth in Table I. Fraction 2 was pelargonamide, containing 8.89 per cent nitrogen (theory=8.92 per cent). The other fractions were higher amides, present in a ratio of monomer to higher amides of about 1:4.7. Of the other fractions, Fractions 4 and 5 were $C_{17}$ and $C_{25}$ amides; and Fractions 7 and 8 were $C_{33}$ amides and higher. These amides have the structural forms shown in Equation 2, supra. Thus, they are 3-n-hexylundecanoamide; 3,5-di-n-hexyltridecanoamide; and 3,5,7-tri-n-hexylpentadecanoamide.

EXAMPLES 2 THROUGH 9

Following the general procedure set forth in Example 1, various olefinic hydrocarbons were reacted with formamide. The details of molar proportions, conditions, solvents, etc. and pertinent results are set forth in Table II.

EXAMPLES 10 AND 11

Using the general procedure of Example 1, dimethyl formamide was reacted with octene-1 and with decene-1. The details of molar proportions, conditions, solvents, etc. and pertinent results therefor are set forth in Table II.

Although the present invention has been described in conjunction with preferred embodiments, it is to be understood that modifications and variations may be resorted to, without departing from the spirit and scope of this invention, as those skilled in the art will readily understand. Such variations and modifications are considered to be within the purview and scope of the appended claims.

Table I

MOLECULAR DISTILLATION OF CRUDE REACTION PRODUCTS OF 1-OCTENE AND FORMAMIDE

| Fraction Number | Temperature Range, °C. | Pressure, Microns | Weight of Fraction, Grams | Analyses of Fractions | | | | Notes |
|---|---|---|---|---|---|---|---|---|
| | | | | Percent N Found | Percent N Calcd. on Basis of Mol. Wt. Found | Mol. Wt. Found | Mol. Wt. Calcd. on Basis of Percent Nitrogen Found | |
| 1 | 100 | 320 | 20 | | | | | Combined with fraction 2 for analysis. |
| 2 | 100–110 | 320 | 128 | 5.45 | 7.41 | 189 | 257 | Mostly pelargonamide. |
| 3 | 100° C. at 320μ to 75° C. at 15μ. | | 64 | | | | | |
| 4 | 80–105 | 15 | 75 | 3.44 | 4.48 | 312 | 407 | Mostly C₁₇ and C₂₅ amides. |
| 5 | 90–120 | 10 | 61 | 3.20 | 3.50 | 400 | 437 | |
| 6 | 120–? | | 58 | | | | | Mol. still broke. Sample lost. |
| 7 | 125–140 | 11 | 22 | 2.86 | 2.63 | 532 | 489 | C₃₃ and higher amides. |
| 8 | 140–170 | 11 | 50 | 2.30 | 1.99 | 705 | 609 | |
| Residue | | | 15 | | | | | |
| Loss | | | 11 | | | | | |

Table II

| Example | Amide | | | Olefin | | | Catalyst | | |
|---|---|---|---|---|---|---|---|---|---|
| | Amide | Grams | Moles | Olefin | Grams | Moles | Peroxide | Grams | Moles |
| 2 | Formamide | 450 | 10 | Octene-1 | 112 | 1 | Di-t-butyl | 14 | 0.098 |
| 3 | do | 180 | 4 | Octene-2 | 112 | 1 | do | 14 | 0.098 |
| 4 | do | 180 | 4 | 2-Ethylhexene-1 | 112 | 1 | do | 14 | 0.098 |
| 5 | do | 180 | 4 | Diisobutylene | 112 | 1 | do | 14 | 0.098 |
| 6 | do | 90 | 2 | Propene | 588 | 14 | do | 14 | 0.098 |
| 7 | do | 225 | 5 | do | 210 | 5 | do | 14 | 0.098 |
| 8 | do | 180 | 4 | α-pinene | 136 | 1 | do | 14 | 0.098 |
| 9 | do | 180 | 4 | Cyclohexene | 82 | 1 | Benzoyl | 24 | 0.098 |
| 10 | Dimethyl formamide | 292 | 4 | Octene-1 | 112 | 1 | Di-t-butyl | 14 | 0.098 |
| 11 | do | 292 | 4 | Decene-1 | 140 | 1 | do | 14 | 0.098 |

| Example | Solvent | Grams | Time, hrs. | Temp., °C. | Crude Product | | |
|---|---|---|---|---|---|---|---|
| | | | | | Grams | Percent Yield | Percent N |
| 2 | Diethyl carbitol | 500 | 24 | 135 | 87.5 | | (¹) |
| 3 | do | 365 | 24 | 135 | 75.0 | | (²) |
| 4 | do | 400 | 72 | 118–135 | 36.0 | 26.4 | 5.51 |
| 5 | do | 400 | 24 | 120–135 | 36.0 | 27.3 | 4.62 |
| 6 | none | | ³ 6.5 | 145 | ⁴ 24.0 | | 0.8 |
| 7 | do | | ³ 6 | 130–160 | 96.5 | 37.9 | 5.44 |
| 8 | Diethyl carbitol | 400 | 24 | 135 | 14.0 | 10.4 | 3.95 |
| 9 | Dioxane | 300 | 27 | 85–90 | 55.0 | 52.9 | 6.56 |
| 10 | none | | 24 | 122 | 49.2 | 37.5 | 2.93 |
| 11 | do | | 24 | 135 | 41.3 | 25.0 | 2.94 |

¹ Product was 1:7.4 mixture monomeric to polymeric product. Monomer had 9.11% N (theory=8.92%). Polymer had 3.37% N.
² Product was 1:24 mixture monomeric to polymeric product. Monomer had 8.73% N (theory=8.92%). Polymer had 3.49% N. Monomer was chiefly pelargonamide from octene-1 impurity in olefin reactant.
³ Pressure reaction run in sealed bomb. All catalyst added initially.
⁴ Included large amount of propylene polymer.

What is claimed is:

1. A process for producing amides which comprises reacting an ethylenically unsaturated hydrocarbon having no conjugated double bonds with a formamide

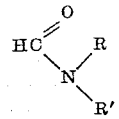

wherein R and R' are radicals selected from the group consisting of hydrogen atoms and lower alkyl radicals, in the presence of a peroxide catalyst, for a period of time varying between about 5 hours and about 70 hours, and at the activation temperature of said peroxide catalyst.

2. A process for producing amides which comprises reacting a 1-olefin with formamide in the presence of a peroxide catalyst, for a period of time varying between about 5 hours and about 70 hours, and at the activation temperature of said peroxide catalyst.

3. A process for producing amides which comprises reacting octene-1 with formamide in the presence of di-t-butyl peroxide, for a period of time varying between about 5 hours and about 70 hours, and at a temperature varying between about 100° C. and about 200° C.

4. A process for producing amides which comprises reacting octene-2 with formamide in the presence of di-t-butyl peroxide, for a period of time varying between about 5 hours and about 70 hours, and at a temperature varying between about 100° C. and about 200° C.

5. A process for producing amides which comprises reacting a cycloolefin with formamide in the presence of a peroxide catalyst, for a period of time varying between about 5 hours and about 70 hours, and at the activation temperature of said peroxide catalyst.

6. A process for producing amides with comprises reacting cyclohexene with formamide in the presence of dibenzoyl peroxide, for a period of time varying between about 5 hours and about 70 hours, and at a temperature varying between about 50° C. and about 110° C.

7. A process for producing amides which comprises reacting a 1-olefin with N,N-dimethylformamide in the presence of a peroxide catalyst, for a period of time varying between about 5 hours and about 70 hours, and at the activation temperature of said peroxide catalyst.

8. A process for producing amides which comprises reacting octene-1 with N,N-dimethylformamide in the presence of di-t-butyl peroxide, for a period of time varying between about 5 hours and about 70 hours, and at a temperature varying between about 100° C. and about 200° C.

9. A process for producing amides which comprises reacting decene-1 with N,N-dimethylformamide in the presence of di-t-butyl peroxide, for a period of time varying between about 5 hours and about 70 hours, and at a temperature varying between about 100° C. and about 200° C.

References Cited in the file of this patent

UNITED STATES PATENTS

| | | |
|---|---|---|
| 2,013,108 | Reppe et al. | Sept. 3, 1935 |
| 2,058,013 | Henke et al. | Oct. 20, 1936 |
| 2,422,632 | Olin et al. | June 17, 1947 |
| 2,457,229 | Hanford | Dec. 28, 1948 |
| 2,478,390 | Hanford | Aug. 9, 1949 |
| 2,608,562 | Roe et al. | Aug. 26, 1952 |
| 2,648,685 | Reppe et al. | Aug. 11, 1953 |